United States Patent Office 3,374,191
Patented Mar. 19, 1968

3,374,191
PROCESS FOR THE PRODUCTION OF ELASTOMERIC DIENE POLYMERS WITH IMPROVED PROPERTIES
Karl Nutzel, Cologne-Stammheim, Germany, assignor to Farbenfabriken Bayer Aktiengesellschaft, Leverkusen, Germany, a corporation of Germany
No Drawing. Filed Aug. 5, 1965, Ser. No. 477,593
10 Claims. (Cl. 260—5)

ABSTRACT OF THE DISCLOSURE

The cold flow characteristics of a synthetic diene polymer are improved by reacting the polymer, while dissolved in an inert hydrocarbon solvent, with a sulfur chloride.

---

It is known that polybutadiene, polyisoprene and their copolymers, which have a high steric regularity, can be prepared using organometallic catalysts. The vulcanisates of these products are valuable starting materials for articles in the rubber industry. Many of these polydienes have a serious disadvantage as regards technical processing, namely; their strong deformability under the influence of slight but steady forces, this influence even being provided by their own weight. This property is referred to as "cold flow." An undesirable cold flow becomes disturbingly apparent during the drying, packing, storage and dispatch of the elastomers and requires a considerable technical and economic additional expense.

This undesirable property can be avoided by increasing the molecular weight of the polymer, by blending therewith products having high or low molecular weights. However, a deterioration in the workability and often a reduction of the mechanical properties of the vulcanisates cannot usually be avoided.

Processes which attempt to avoid the cold flow are for example the treatment of diene elastomers with Friedel-Crafts catalysts or Friedel-Crafts catalysts and cocatalysts, e.g., aluminium ethyldichloride and thionylchloride. However, with this process, the stopping of the reaction at the correct instant presents difficulties, since a complete and rapid deactivation of the Friedel-Crafts catalyst can only be carried out with very great difficulty in the highly viscous solution. Thus, neither the viscosity of the material can be established accurately in advance, nor can one be certain that there will be no increase in viscosity during the storage of the material, due to undecomposed catalyst residues. The ash content of the polymer is increased by adding the inorganic catalysts, the decomposition products of which remain in the polymer.

These disadvantages are avoided by the process according to the invention as hereinafter described.

It has now been found that the cold flow can be considerably improved, without impairing the workability and without unfavourably influencing the mechanical properties of the vulcanisates, if diene polymers are treated with oxygen-free halides of sulphur, for example, with disulphur dichloride, sulphur dichloride, disulphur dibromide or sulphur dibromide. Disulphur dichloride is particularly effective. Suitable diene polymers are more especially polybutadiene, and polyisoprene and their copolymers, in particular stereospecifically polymerised products.

This process is certainly not limited to the above polymers but may be used in treating butadiene-acrylonitrile copolymers, polychloroprenes, copolymers of butadiene and styrene and ethylene-propylene terpolymers (the third component being, e.g., dicyclopentadiene, norbornadiene, cyclooctadiene and hexadiene-1,5).

The halides of sulphur can be mixed with the elastomers in a kneader or on a roller. However, it is more appropriate in practice to introduce measured quantities of the sulphur halides into aromatic or aliphatic hydrocarbon solutions of the elastomers, as they are obtained, e.g., at the end of the stereospecific polymerisation in hydrocarbon solvents. This method is particularly simple and involves little technical expense, since the sulphur chlorides are soluble in the usual polymerisation solvents, such as heptane, pentane, benzene, toluene, cyclohexane, etc., and any excess easily can be removed during the final processing without leaving any residue. The sulphur halides may be used as deactivators for the catalysts or catalyst systems.

Wide limits can be set for the temperatures which are to be maintained during and after the addition of the sulphur halides. The same effect is obtained at $-10°$ C. and at 200° C., but the process may also be carried out at lower temperatures, e.g., at $-30°$ C. It is advantageous to work at temperatures between 20 and 50° C. The sulphur halides are caused to act at room temperature for up to about 30 minutes. Longer times can be chosen without harming the polymer.

The quantity of the sulphur halide to be used depends on the Mooney plasticity of the elastomers required after the treatment. Larger quantities of sulphur correspond to higher degrees of plasticity, and vice versa. The upper limit is given by the occurrence of an insoluble gel, which can be formed after sulphur halides are added. Generally speaking, this limit is 1.5 parts of sulphur chloride to 100 parts of elastomer. Quantities below 0.01 part, especially below 0.005 part to 100 parts of elastomer are usually ineffective. It is advantageous to add 0.1 to 0.8 part to 100 parts of elastomer.

The dissolved solid rubber optionally is provided with a stabiliser and isolated, e.g., by introducing the solution into boiling water. The solvent is removed and can be used again.

The butadiene polymerisation reactions in the examples indicated were carried out under the usual conditions of stereospecific polymerisation with iodine-containing organometallic mixed catalysts in toluene, and the isoprene polymerisation reactions were carried out in heptane and with lithium butyl as catalyst. The catalyst system was so chosen in both cases that as unfavourable a cold flow as possible was obtained, in order more clearly to set forth the effects.

In the following examples, the cold flow is indicated in milligrams per minute (mg./min.). It was determined by means of a modified discharge plastometer at 50° C. This method is most highly adapted to practical conditions. The cold flow of the normal commercial polybutadienes, determined by this method, fluctuates between 5 and 30 mg./min., depending on the product.

The parts indicated in the following examples are parts by weight, unless otherwise mentioned.

*Example A.*—For the production of 1,4-cis-polybutadiene 100 parts of 1,3-butadiene were dissolved in 900 parts of dry toluene in a dry stirrer-type vessel covered with nitrogen and provided with external cooling. The solution cooled to $-5°$ C. had added thereto, while stirring, 0.491 part of aluminium triisobutyl (25% solution in toluene), thereafter 0.157 part of iodine (0.5% solution in toluene) and 0.059 part of titanium tetrachloride (3% solution in toluene). The polymerisation of the butadiene started immediately and was so conducted that the temperature did not rise above 25° C. After 3 hours the conversion was 95% and after another hour it was 96%. The Mooney viscosity was ML-4=48.

*Example B.*—For the production of polyisoprene 100 parts of dry isoprene were dissolved in 900 parts of dry hexane in the apparatus described in Example A. To the solution cooled to 15° C. there were added with stirring 1.58 parts of aluminium triisobutyl (25% solution in hexane) and 1.52 parts of titanium tetrachloride (10% solution in hexane). The copolymerisation of isoprene started immediately and was kept at a temperature of 20 to 25° C. After 6 hours the conversion was 87%. The Mooney viscosity of the polyisoprene was ML–4=47.

*Example C.—For the production of ethylene-propylene terpolymer*

In a dry stirrer-type autoclave rinsed with nitrogen 150 g. of dicyclopentadiene were dissolved in 45 kg. of dry hexane. A nitrogen pressure of 1.4 atmospheres was established in the autoclave. 4 kg. of propylene and 0.4 kg. of ethylene were introduced under pressure. As catalyst 123 g. of ethylene-aluminium sesquichloride (20% in hexane) and 8.5 g. of vanadium oxychloride (5% in hexane) were added in measured quantities. The polymerisation started immediately. An ethylenepropylene mixture (molecular ratio 1:1) was introduced during polymerisation at such a rate that a pressure between 1.8 and 3.2 atmospheres was maintained. The reaction temperature was kept between 25 and 35° C. After 30 minutes half the amount each of the initially added quantities of catalyst was added in measured quantities. After a further 30 minutes the addition of the etyhlene-propylene mixture was stopped. The yield of rubber was 2.6 kg. The amorphous product contained 40% ethylene units, 54% propylene units and 6% dicyclopentadiene units. The Mooney-value was ML–4=49.

*Example D.—For the production of a butadiene-styrene block copolymer*

In the apparatus described in Example A, 75 parts of dry butadiene and 25 parts of dry styrene were dissolved in 735 parts of dry toluene. 0.110 part of lithium-n-butyl (0.5 normal solution in toluene) were added with stirring in measured quantities to the solution heated to 45° C. The polymerisation started immediately and was kept at 50° C. After 1½ hours the reaction temperature was raised to 65° C. After totally 3 hours the polymerisation was stopped at a conversion of 98%. The product had a Mooney-value of ML–4=44 and a polystyrene-content of 23.4% which was determined by decomposition by oxidation.

*Example 1*

300 parts by weight of butadiene are polymerised with a known iodine-containing organometallic mixed catalyst in 3,000 parts by weight of toluene. With a conversion of 98%, the polymerisation mixture was divided into two halves. The first half was stopped with 3 parts of stearic acid per 100 parts by weight of monomer, stabilised with 0.8 part by weight of 3,3'-di-tert.-butyl-5,5'-dimethyl-2,2'-dihydroxydiphenyl methane per 100 parts by weight of solid rubber and the solid rubber was separated out by introducing the solution into boiling water and drying. The cold flow of this polybutadiene was 42.7 mg./min.

After stopping the second half, 0.5 part by weight of disulphur dichloride, based on 100 parts by weight of polybutadiene, was added and the mixture was stirred for another hour. The cold flow of the polybutadiene after stabilisation, separation and drying, was 0.6 mg./min. The product was free from gel.

*Example 2*

1,500 parts by weight of butadiene were polymerised in 15,000 parts by weight of toluene to a conversion of 95% using an iodine-containing organometallic complex catalyst and then stopped. 2,000 parts by weight of the solution were tapped off and worked up as described in Example 1. The corresponding polybutadiene had a Mooney value of 35 ML–4 and a cold flow of 32 mg./min. 160 parts by weight of the polybutadiene were blended with 50 parts by weight of natural rubber. Using this blend, a vulcanisation mixture was prepared according to a conventional recipe.

The remaining part was stopped, 0.2 part by weight of $S_2Cl_2$ was added per 100 parts by weight of solid rubber, and the mixture was stirred for another 30 minutes at room temperature. The polymer was then stabilised, separated and dried, as previously described. The crude sheet had a plasticity of 48 Mooney ML–4 and the cold flow was 2.1 mg./min. 1,000 parts by weight of polybutadiene were blended with 300 parts by weight of natural rubber and mixed in the same way as the first part according to the same recipe. The mixing ratio was practically identical with that of the first part. The mechanical properties of the vulcanisates of the second part are slightly better than those of the first part.

*Example 3*

1,500 parts of butadiene were polymerised in 15,000 parts of toluene in the absence of air and moisture with an iodine-containing organometallic complex catalyst. With a conversion of 83%, the polymerisation was stopped using 30 parts of stearic acid and divided into 3 equal portions.

(a) The first portion was stabilised with 2 parts of 2,2' - dihydroxy - 3,3' - di-tert.-butyl - 5,5' - dimethyl diphenyl methane and the solution introduced into water at a temperature of 97° C. After removing the solvent, the crude rubber was isolated and dried. The plasticity was 32 Mooney ML–4 and the cold flow was 39.6 mg./min.

(b) The second portion was stopped, 0.5 part of disulphur dichloride ($S_2Cl_2$) was added while stirring and, after 1 hour, it was stabilised like the first portion and worked up. The plasticity was 48 Mooney ML–4 and cold flow 3.2 mg./min.

(c) The third portion was stopped, 0.5 part of sulphur dichloride ($SCl_2$) was added while stirring and, after 1 hour, stabilised like the first part, worked up and dried. The plasticity of the crude rubber was 54 Mooney and the cold flow was 2.2 mg./min.

*Example 4*

400 parts of isoprene were polymerised in 4,000 parts of n-heptane with 0.06 part of lithium butyl with exclusion of air and moisture. The polymerisation was stopped with 4 parts of stearic acid. The polymer solution was thereafter divided into two halves.

The polymer of the first half was precipitated by pouring into 6 litres of isopropyl alcohol, stabilised with 0.8 part of 2,6 - di-tert.-butyl - 4 - methylphenol and dried. The Mooney value was 38 ML–4 and the cold flow 22.2 mg./min.

0.4 part of disulphur dichloride were added to the second half while stirring. After 1 hour, the polymer was precipitated as described in isopropyl alcohol, stabilised and dried. The plasticity was increased to 48 Mooney ML–4 and the cold flow fell to 6.2 mg./min.

*Example 5*

1,500 parts of butadiene were dissolved in 15,000 parts of toluene and polymerised under the usual conditions of stereospecific polymerisation with an iodine-containing organometallic complex catalyst. After the almost quantitative conversion, 45 parts of stearic acid were added to the solution for deactivating the catalyst and the mixture was divided into three equal portions.

One portion was stabilised with 2 parts of 2,2'-dihydroxy - 3,3' - di-tert.-butyl - 5,5' - dimethyl diphenylmethane and the solution was worked up as repeatedly described in the preceding examples. The crude rubber was rolled to form a sheet and dried. The Mooney value was 37 ML–4 and the cold flow 34.2 mg./min.

One part of disulphur dibromide, dissolved in 10 parts of toluene, was added to the second portion while stirring steadily and stirring was continued for 35 minutes. Thereafter, 2 parts of 2,2'-dihydroxy-3,3'-di-tert.-butyl-5,5'-dimethyl diphenylmethane were incorporated by stirring and the solution worked up in the usual way. The polybutadiene had a Mooney value of 46 ML-4 and a cold flow of 7.2 mg./min.

One part of sulphur dibromide, dissolved in 12 parts of toluene, was added to the third portion while stirring steadily, and the stirring was continued for 35 minutes. Thereafter, 2 parts of 2,2'-dihydroxy-3,3'-di-tert.-butyl-5,5'-dimethyl diphenylmethane were added to the solution and the solid rubber isolated in the usual way. This polybutadiene had a Mooney value of 41 ML-4 and a cold flow of 11.2 mg./min.

*Example 6*

3,000 parts of butadiene were dissolved in 30,000 parts of toluene and polymerised with an iodine-containing organometallic complex catalyst until the conversion was practically quantitative. The catalyst was deactivated with 60 parts of abietic acid and the mixture was divided out into two halves.

One half was stabilised with 6 parts of 2,2'-dihydroxy-3,3'-di-tert.-butyl-5,5'-dimethyl diphenylmethane and the solution worked up in the usual way. The Mooney value of the polybutadiene was 33 units and the cold flow was 33 mg./min.

3 parts of disulphur dichloride, dissolved in 30 parts of toluene, were added to the second half while stirring vigorously, and stirring was continued for another 40 minutes. 6 parts of 2,2'-dihydroxy-3,3'-di-tert.-butyl-5,5'-dimethyl diphenylmethane were thereafter stirred into the solution, which was worked up as previously described. The ML-4 Mooney value of the polybutadiene was increased to 42 and the cold flow fell to 4.7 mg./min.

Blends with natural rubber were prepared from both products. 100 parts of the blends contained 70 parts of polybutadiene and 30 parts of natural rubber. From both blends, the usual tread surface mixtures were prepared and these were vulcanised in the usual way. The workability, the sprayability and the making-up tackiness of the mixtures of both blends were practically the same. The following table of the mechanical properties of the mixtures shows a slight advantage over the mixture which was prepared with the aftertreated polybutadiene.

| Mechanical properties | A | B |
|---|---|---|
| Strength (kg./cm.²) | 140 | 150 |
| Elongation (percent) | 620 | 600 |
| Modulus 300%/500% (kg./cm.²) | 50/105 | 55/115 |
| Structure (kg./cm.³) | 30 | 30 |
| Hardness (Shore) 20° C./70° C | 59/56 | 59/56 |
| Elasticity (percent) | 44/49 | 46/50 |

A=Vulcanisate, the mixture of which contains untreated polybutadiene.
B=Vulcanisate, of which the mixture contains polybutadiene after treated with $S_2Cl_2$.

*Example 7*

1,500 parts of butadiene were polymerised in 15,000 parts of toluene in the absence of air and moisture, using an iodine-containing organometallic complex catalyst. After 3 hours, the polymerisation was stopped by adding 30 parts of stearic acid and the unreacted monomer was removed. The solution was divided into 3 equal portions.

(a) The first portion was stabilised with 2 parts of 2,2'-dihydroxy-3,3'-di-tert.-butyl-5,5'-dimethyl diphenylmethane and the solution introduced into hot water. After removing the solvent the crude rubber was isolated and dried. The viscosity was 38 Mooney ML-4 and the cold flow was 30.7 mg./min.

(b) 0.5 part of disulphur dichloride, dissolved in 50 parts of toluene, were added to the second portion while stirring vigorously. After 5 minutes, the mixture was stabilised in the same manner as the first portion and worked up. The viscosity was 95 Mooney ML-4 and the cold flow was 0.6 mg./min.

(c) 0.6 part of sulphur dichloride ($SCl_2$), dissolved in 50 parts of toluene, were added to the third portion while stirring vigorously. After 1 hour, the mixture was stabilised, worked up and dried, as already mentioned. The viscosity of the crude rubber was 85 Mooney ML-4 and the cold flow was 0.7 mg./min.

I claim:
1. A process for the production of an elastomeric polybutadiene of improved cold flow properties which comprises adding to a solution of said polymer in a hydrocarbon solvent 0.5 part by weight of disulphur dichloride per 100 parts by weight of butadiene, stirring the resulting mixture, and separating the polymer therefrom.

2. The process of claim 1 wherein said polybutadiene solution comprises a toluene solvent and residual polymerization catalyst.

3. The process of claim 1 wherein the polybutadiene further contains a stabilizing amount of 3,3'-di-tert.-butyl-5,5'-dimethyl-2,2'-dihydroxydiphenyl methane.

4. A process for producing polybutadiene having improved cold flow characteristics which comprises stirring into a toluene solution of polybutadiene about 0.5 part of $S_2Cl_2$ or $SCl_2$, per 100 parts by weight of polybutadiene, stabilizing the resulting solution with 2,2'-dihydroxy-3,3'-di-tert.-butyl-5,5'-dimethyl diphenyl methane, and isolating the resulting polymer therefrom.

5. In a process wherein isoprene is polymerized in n-heptane in the presence of a catalytic amount of lithium butyl in an inert atmosphere, and the polymerization is stopped with stearic acid, the improvement comprising increasing the Mooney plasticity of the polymer by adding to the resulting polymer solution a small amount of $S_2Cl_2$ with stirring.

6. A process for producing polybutadiene of improved cold flow characteristics which comprises stirring into a toluene solution of polybutadiene containing residual iodine-containing organometallic complex catalyst a small amount of $S_2Cl_2$ and a stabilizer, separating the resulting polybutadiene, and blending it with natural rubber to form a tread surface mixture which is subsequently vulcanized.

7. A process for producing a vulcanizable synthetic diene polymer which comprises reacting a synthetic diene polymer dissolved in an inert hydrocarbon solvent and having a Mooney plasticity of between 15 and 80 ML-4, with an oxygen-free sulfur chloride at a temperature between —30 and 200° C. and recovering the resulting polymer from the solution, whereby the Mooney value of said diene polymer is increased and its cold flow is reduced.

8. The process of claim 7 wherein the diene polymer is reacted with the oxygen-free sulfur chloride in proportions of about 0.1–1.5 parts of sulfur chloride per 100 parts of polymer.

9. The process of claim 7 wherein said diene polymer is selected from the group consisting of polybutadiene, polyisoprene, copolymers of butadiene and acrylonitrile, polychloroprene, copolymers of butadiene and styrene and ethylenepropylene terpolymers.

10. The process of claim 7 wherein said diene polymer is 1,4-cis-polybutadiene.

References Cited

UNITED STATES PATENTS

| 2,448,391 | 8/1948 | Pyle | 260—82.1 |
| 3,240,841 | 3/1966 | Hsieh | 260—94.7 |
| 2,291,404 | 5/1942 | Morway | 260—139 |

OTHER REFERENCES

Chemical Abstracts, volume 51, column 9199.

MORRIS LIEBMAN, *Primary Examiner.*

S. L. FOX, *Assistant Examiner.*